Nov. 10, 1970  W. B. COLVIN  3,539,354

METHOD OF PRODUCING A SANDWICH

Filed Sept. 20, 1967  2 Sheets-Sheet 1

INVENTOR
WILLIAM B. COLVIN

BY
J. Warren Kinney, Jr.
ATTORNEY

Nov. 10, 1970      W. B. COLVIN      3,539,354
METHOD OF PRODUCING A SANDWICH
Filed Sept. 20, 1967      2 Sheets-Sheet 2
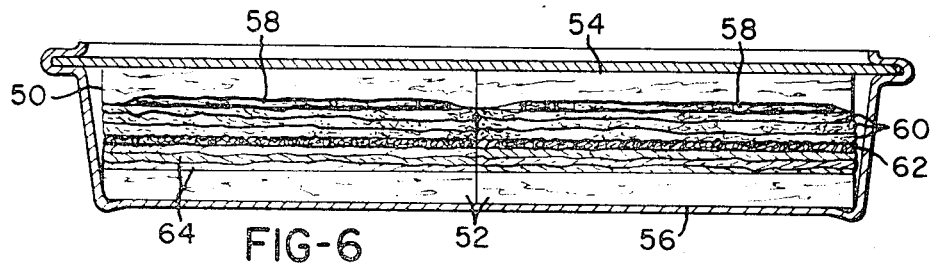
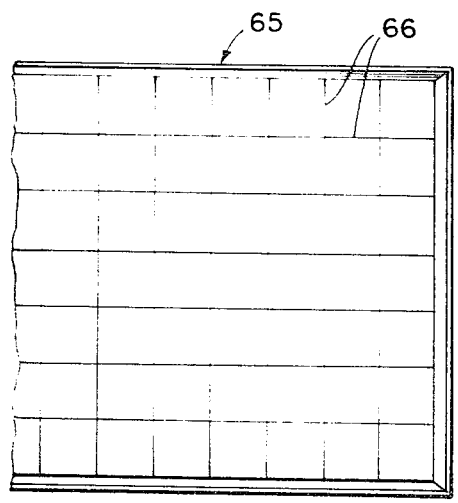
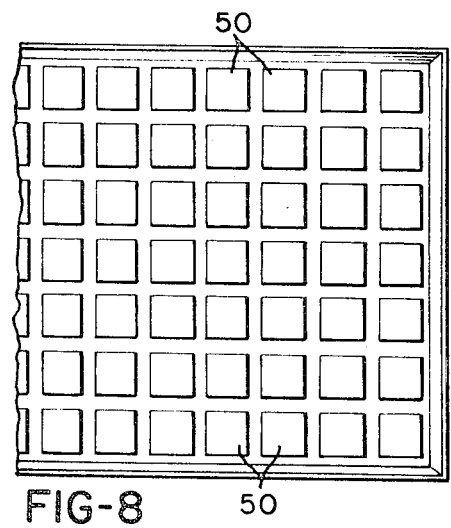
INVENTOR
WILLIAM B. COLVIN
BY *J. Warren Kinney, Jr.*
ATTORNEY 3,539,354
METHOD OF PRODUCING A SANDWICH
William B. Colvin, Mount Healthy, Ohio, assignor to E.
Kahn's Sons Company, Cincinnati, Ohio, a corporation
of Ohio
Filed Sept. 20, 1967, Ser. No. 669,094
Int. Cl. A23l 1/34; B65b 25/22
U.S. Cl. 99—1                                                     8 Claims

ABSTRACT OF THE DISCLOSURE

A frozen package which comprises a container for a sandwich, in which bread slices of the sandwich are held in intimate flatwise contact with metallic surfaces of the container and a lid therefor, so that said metallic surfaces will grill the sandwich during a single oven heating period acting primarily to thaw the frozen sandwich and warm it to a desirable eating condition. This method of preparation constitutes a single-step convenient procedure which eliminates repeated handling of the package and its contents, with a minimum expenditure of time, effort, and preparation.

---

The present invention relates to and the method of preparation of a frozen food product.

The particular food product involved is a sandwich merchandised in frozen condition within a sealed container, which container serves not only to protect the sandwich constituents from contamination and spoilage, but serves also as a grilling agent for the bread slices of the sandwich as the container is subjected to oven heating preparatory to consumption.

An object of the invention is to provide a method of making a frozen sandwich so packaged that top and bottom elements of a container in which the sandwich is sealed and frozen, perform the function of grilling the outer surfaces of the bread slices of the sandwich incident to heating the entire sealed package in an oven at a proper temperature for a predetermined period of time.

Another object of the invention is to provide a method of preparing tasty grilled or toasted sandwiches for consumption, with a minimum expenditure of time, effort and preparation.

A further object of the invention is to provide a method for making an improved package of the character and for the purposes above stated, which may be frozen for merchandising and subsequently heated either while frozen or thawed, to render the edible contents of the package suitable for consumption immediately upon opening the heated package.

The foregoing and other objects are attained by the means described herein and illustrated upon the accompanying drawing, in which:

FIG. 6 is a vertical cross-section similar to FIG. 2 but disclosing a different type of sandwich embodying the teachings of the present invention.

FIG. 7 is a plane view of a step in the preparation of slices of sweet bread for use in the sandwich of FIG. 6.

FIG. 8 is a plane view of the slices of FIG. 7 ready for use in making a sandwich of FIG. 6.

Figure 3:
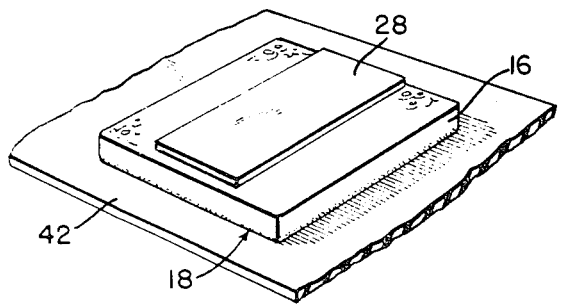
FIG. 3 is a perspective view of a bread slice prepared for use in forming the sandwich.
Figure 4:
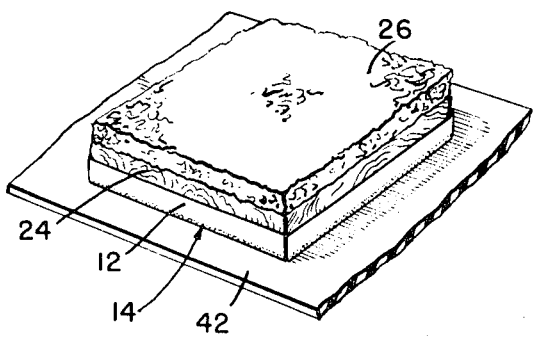
FIG. 4 is a perspective view of a second bread slice prepared for use in forming the sandwich.
Figure 5:
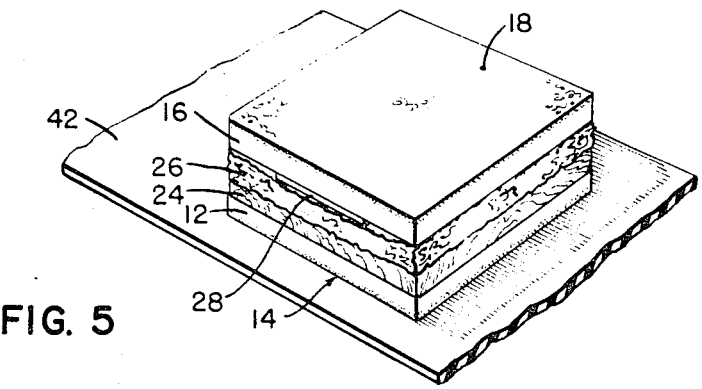
FIG. 5 is a perspective view of a completed sandwich ready for insertion into a container.

Food products of various kinds have been marketed in frozen condition, often within sealed containers of one type or another capable of withstanding the heat of a household bake oven used for thawing and/or warming or cooking the contents for human consumption. The practice, in general, has become largely commonplace and widely employed for the convenient and expeditious preparation of foodstuffs requiring mere cooking, baking, or warming to render them palatable. One such practice is disclosed in the issued patent of L. W. Crosby, No. 2,990,096, dated June 27, 1961, wherein frozen foods and a bun or roll are loosely housed and sealed within an aluminum container, to be subjected to heat for thawing and cooking the contents.

The present invention relates to a meritorious improvement over the prior art in that grilling of the food product is provided for specifically in the preparation of packaged sandwiches which desirably are to be grilled at the exposed or outer surfaces of the bread slices comprising the sandwiches. The grilling is accomplished by so packaging the sandwich that its outermost bread slices are maintained in firm contact with parts of a container therefor which readily transfer oven heat to the bread slices. Thus, the same sealed container in which the sandwich is frozen for storage and merchandising constitutes the means for grilling the outermost bread slices of the sandwich when exposed to a proper oven temperature. The grilling of sandwiches heretofore has required a separate time-consuming step.

With reference to the accompanying drawing, and in particular with reference to FIGS. 1–5, the numeral 8 indicates a container constructed preferably of disposable thin metal foil, having a thin foil bottom wall 10 which readily may transfer oven heat to a sandwich placed thereon. The bottom wall preferably is planar in conformity with the contacting buttered or oiled face 14 of a bread slice 12 of the sandwich. An uppermost bread slice 16 of the sandwich has a buttered outer or upper face 18 which is maintained in firm contact with the inner lower face 20 of a container lid 22, said face 20 being highly conductive of oven heat to assure grilling of the buttered bread slice face 18.

The reference numerals 24, 26 and 28 denote food products which may be interposed between the bread slices 12 and 16 as fillers in forming the sandwich. The number and the nature of the fillers are of course subject to considerable variation, and may vary also as to amounts and proportions. In a typical reuben sandwich, for example, the numeral 24 may indicate layers of meat such as thinly sliced corned beef, upon which may be superposed a layer 26 of sauerkraut. If cheese is to be a constituent of the sandwich, a slice or layer 28 of a suitable cheese may be incorporated therein in such a manner as to be on top of the other ingredients, that is, immediately under the top slice.

The container 8 of thin metal disposable foil may be of any shape or size, and may contain one or more assembled sandwiches which rest flatwise upon the bottom 10 as previously stated, with a buttered or oiled face of a bread slice in intimate contact upon the bottom 10. If the container is to be angular as shown in the drawing by way of example, it may include upstanding walls 30 integral with the bottom wall 10, and each upstanding wall may include a ledge 32 to support marginal portions of the lid or cover 22. Each upstanding wall may include also a deformable upper flange member 34 to be turned onto a margin of the lid resting upon ledge 32, to effect a substantially air-tight seal circumferentially of the container. The sealed container and its contents are then subjected to flash freezing at temperatures of −20° to −40° F. for a period of time sufficient to thoroughly freeze all portions of the contents of the container. Thereafter the frozen package may be stored and merchandized like other types of frozen goods.

Figure 2:
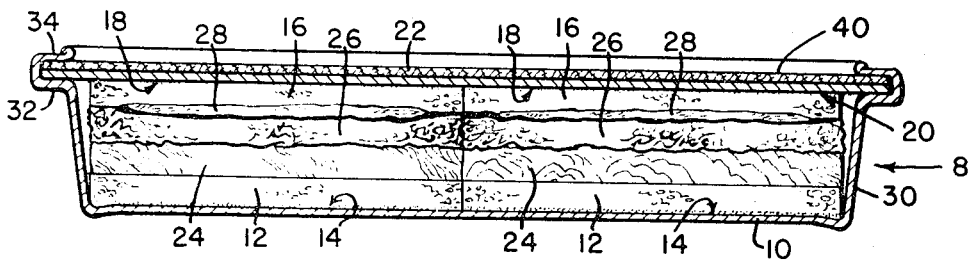
FIG. 2 is a vertical cross-section taken on line 2—2 of FIG. 1 but showing the contents after being thawed, heated and grilled.

The purchaser of the frozen package may obtain a freshly grilled reuben sandwich by placing the frozen package in a household oven preheated to a temperature of about 400° F., for a period of time approximating thirty minutes; or as an alternative procedure, the contents of the sealed package may be permitted to thaw in the package before placement in the preheated 400° F. oven, whereupon the grilling time may be reduced to about ten minutes. In either case, the sandwich upon removal of lid 22 will be found freshly and uniformly grilled to a flavorful crispy brown crust pleasing in taste and appearance, and as illustrated in FIG. 2 the cheese 28 will have been melted. The grilling is accomplished within the container incident to heating the container of the sandwich, and involves no separate handling or treatment.

The lid 22 may be formed either as a foil-laminated structure, or as a single sheet of heat-conductive thin metal foil such as aluminum. If laminated, the lid may comprise a thin imperforate metal foil sheet 20 to which is flatly laminated an overlying external sheet 40 of cardboard or other suitable stiffening material capable of sustaining the foil sheet 20 in flatwise contact with the buttered upper face 18 of bread slice 16.

In commercial production of the package, a conveyor 42 (FIGS. 2 and 3), may be employed as a support upon which an attendant may first place two bread slices 16 and 12, with the buttered surfaces 18 and 14 of the slices down, that is, contacting the upper face of the conveyor. Then a slice of cheese 28 may be placed upon the upper, unbuttered surface of bread slice 16, while upon the upper, unbuttered surface of bread slice 12 may be deposited layers 24 of thinly sliced corned beef, and a covering layer 26 of sauerkraut. Thereafter the cheesebearing slice 16 may be inverted and placed upon the assembly of FIG. 4, as in FIG. 5, and the whole may then be placed flatwise upon the planar bottom wall 10 of the container, after which the lid 22 is applied and sealed by turning down the initially upstanding flanges of the container 8.

The package completed as above explained, may be flash-frozen and subsequently displayed for sale in the frozen condition.

It is important to note that the effective depth of container 8 from the underface of lid 22 to the upper face of container bottom 10, should not exceed the height of the assembled sandwich, so that the buttered faces of bread slices 12 and 16 will always be under slight compression. In fact, it is desirable that the initial thickness of the assembled sandwich be somewhat greater than the space between the lid and the bottom wall of container 8, to assure compression of the sandwich and firm contact of the buttered bread slices with the grilling surfaces of the lid and container.

Figure 1:
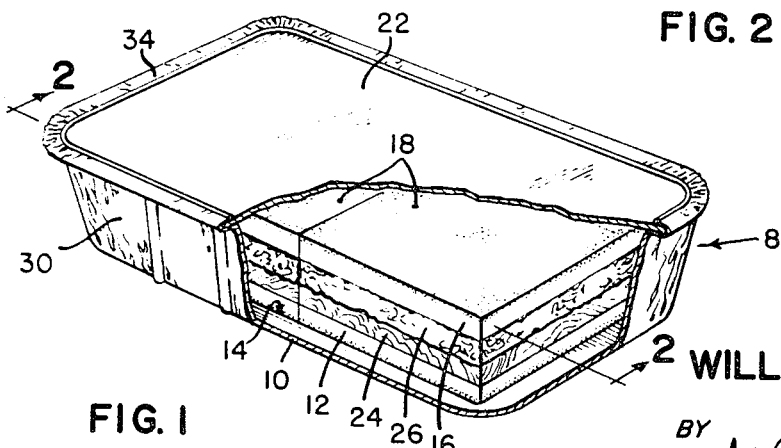
FIG. 1 is a perspective view of a frozen sandwich package embodying the teachings of the present invention with portions of the container removed for clarity of detail and understanding.

As illustrated in FIGS. 1 and 2 the container may, if desired, be dimensioned to house two sandwiches in side by side relationship.

An important feature of the present invention relates to the buttering of the outermost surfaces of the upper and lower bread slices. Each of said outer surfaces should be completely covered with a uniform coating of butter, which may, in the preferred embodiment, be applied in liquid form via a brush, spray, or the like to one surface of slices 12 and 16 before said slices are placed with their respective buttered surfaces down on conveyor 42 as in FIGS. 3 and 4 in order that various ingredients of the sandwich may be placed upon the upper, unbuttered surfaces of slices 12 and 16 of FIGS. 3 and 4.

The buttered surfaces effectively preclude loss of moisture of the bread and the sandwich ingredients. The butter also protects the outer surfaces of the bread slices and preserves them in a lubricated, non-crumbling condition which results in a delightful flavor and aroma when said surfaces are grilled incident to heating the package as described.

The bread used in making the sandwich may be baked of any acceptable flour commonly used in the baking industry, such as rye or wheat flour or the like.

FIG. 6 discloses a sandwich packaged in the manner of FIGS. 1 and 2, but wherein the sandwich ingredients are such that buttering or oiling of the bread slices as a production step is completely eliminated. In accordance with FIG. 6, the upper and lower components 50 and 52 are squares of sweet bread, or Danish pastry, which contain a considerable amount of butter or shortening. Due to the presence of an ample amount of butter or shortening in this type of bread, a sandwich assembled with the use of such bread may be packaged in accordance with the teaching hereinbefore disclosed but with omission of the steps of buttering or oiling the outer surfaces 54 and 56 of the bread squares. The squares 50 and 52 of Danish pastry, being in contact with the lid and the bottom of container 8, will toast or brown while the closed package is subjected to the recommended oven heat, notwithstanding the absence of butter coatings on the outer faces of the bread squares.

The reference numerals 58, 60, 62, and 64 of FIG. 6, denote food products which may be interposed between the bread squares 50 and 52 as fillers in forming the sandwich. The number and the nature of the fillers may vary, although in a typical sandwich involving the use of Danish sweet bread, the numeral 64 may indicate thin slices of seasoned cooked beef upon which is superposed a layer of coating 62 of chili sauce topped with one or more fully cooked party ham slices 60. Between the bread square 50 and the ham slices 60 may be interposed a layer or slice 58 of a cheese such as Swiss cheese. A sandwich so composed is known as a "Combo" sandwich.

The sandwich of FIG. 6, as well as that of FIGS. 1 through 5, is to be placed in container 8 with the cheese slice above the other fillers, so that in the process of oven-heating the package, the cheese may melt into the subjacent filler materials with desirable effect tastewise. Also, by placing the cheese slice at the higher elevation within the package, the melted cheese is unlikely to settle and adhere to the bottom of container 8 and thereby render difficult the removal of the sandwich from the container.

The sweet bread or Danish pastry used in composing the sandwich of FIG. 6 is extremely frangible, and cannot for practical sandwich purposes be baked as a loaf and then sliced like leavened bread. This is due to the large amount of shortening present in the dough, and the absence of a leavening agent such as yeast. Accordingly, the dough is preferably formed into squares or patties by first rolling it to a slab of uniform thickness upon a flat sheet pan 65, and then cutting or scoring the slab as at 66 in FIG. 7 preparatory to baking in an oven. After baking, the pan with the dough thereon is removed from the oven in the condition illustrated by FIG. 8, wherein the squares 50 are shrunk from one another to form individual pieces that may be easily stripped from the pan and thereafter used in composing the sandwich of FIG. 6.

The sandwich of FIG. 6 may be assembled according to FIGS. 1 and 2, that is, the required two squares of Danish sweet bread may be placed upon a suitable surface, one square being embellished with a slice of cheese, and the other with the desired layers of seasoned cooked beef, chili sauce, and party ham. Then the square carrying the cheese slice may be inverted upon the other prepared square, whereupon the whole may be placed in a container such as 8, which is then properly sealed and quick-frozen.

The frozen package as supplied to the consumer or purchaser, may be prepared for consumption by baking in an oven according to the instructions previously specified herein, or with possible minor modification as may be recommended by the supplier.

The cooked beef utilized in the sandwich may be advantageously pre-cooked to a semi-rare state, and then sliced and seasoned, so that when the sandwich is warmed or grilled by the consumer, the beef will not be over-done and have a warmed-over flavor typical of cooked beef which has been re-warmed or re-cooked. Contact of the upper and lower squares 50 and 52 with the metallic lid and the metallic bottom of the container 8, assures a light grilling of the butter-rich squares under proper oven heating, thereby to produce a sandwich which is tasty and palatable.

The sandwich made with Danish pastry or sweet bread departs very substantially from any ordinary sandwich in taste and texture, and would be extremely difficult to duplicate with the use of average household equipment because of the technique involved in producing the baked squares of Danish pastry or sweet bread.

The pan or container 8 preferably is formed of thin aluminum foil, which assures quick freezing of the contents and a sealing-in of all flavor at the peak of freshness, without loss of desirable moisture. The foil pan or container, being also an excellent conductor of heat, enhances the warming and grilling procedure, with a minimum expenditure of heating time.

It is to be understood that various modifications and changes may be made in the composition, form, and handling of the subject matter of the present invention, without departing from the spirit of the invention.

What is claimed is:

1. The method of producing a sandwich which comprises the steps of:
   (a) providing two slices of fresh bread or the like having inner and outer surfaces and each having butter or the like at least at their outer surface,
   (b) interposing successive layers of edible sandwich filler ingredients between the inner surfaces of the bread slices or the like for completing the sandwich,
   (c) housing and compressing said sandwich in a metallic container having upper and lower, heat conducting surfaces with the outer surfaces of the bread slices or the like in coplanar, contacting relationship with each of the said heat conducting surfaces of the container,
   (d) sealing the container to preclude the entry or egress of air thereto,
   (e) subjecting the sealed container and its contents to flash freezing to provide a frozen package,
   (f) thereafter subjecting the frozen package to a temperature sufficiently elevated to successively thaw and then to thoroughly heat the contents of the container while simultaneously grilling the outer surfaces of the bread slices or the like,
   (g) opening the container and removing the grilled sandwich.

2. The method as called for in claim 1, wherein the temperature to which the frozen package is heated for thawing, heating and grilling the sandwich approximates 400° F.

3. The method as called for in claim 1, wherein the container includes a bottom wall and a circumferential side wall upstanding from said bottom wall, and wherein the container is sealed by bending the upper marginal portion of the side wall outwardly of the container forming a ledge, placing a heat conductive cover on said container with the marginal edge thereof in overlying relation to said ledge, and bending the outer edge of said ledge back over said ledge and said cover forming a flange sealingly clamping said cover to said container side wall.

4. The method of producing a sandwich as in claim 1 wherein said bread slices are initially unbuttered and including the step of applying a coating of butter to one surface of each slice of bread and wherein successive layers of cheese, sauerkraut and thinly sliced corned beef are interposed between the unbuttered surfaces of the bread slices.

5. The method of producing a sandwich as in claim 1 wherein said bread slices or the like comprise two uniformly thick squares of Danish sweet bread containing butter in substantial amount and wherein successive layers of cheese, party ham slices, chili sauce, and seasoned cooked beef are interposed between said bread squares.

6. The method as specified by claim 5, wherein the seasoned cooked beef is in semi-rare state.

7. The method as specified by claim 5, wherein the aforesaid heating of the frozen package is performed at a temperature approximating 400° F.

8. The method of producing a sandwich as in claim 1 wherein at least two sandwiches are placed in said container in side-by-side relationship.

References Cited

UNITED STATES PATENTS

| 2,609,301 | 9/1952 | Lindsey | 99—174 |
| 2,912,336 | 11/1959 | Perino | 99—174 |
| 2,990,096 | 6/1961 | Crosby | 229—15 |
| 3,142,413 | 7/1964 | Grogel | 220—67 |

FOREIGN PATENTS

| 973,991 | 11/1964 | Great Britain. |

LIONEL M. SHAPIRO, Primary Examiner

W. C. LAWTON, Assistant Examiner

U.S. Cl. X.R.

99—171, 192; 206—46